United States Patent Office 3,337,702
Patented Aug. 22, 1967

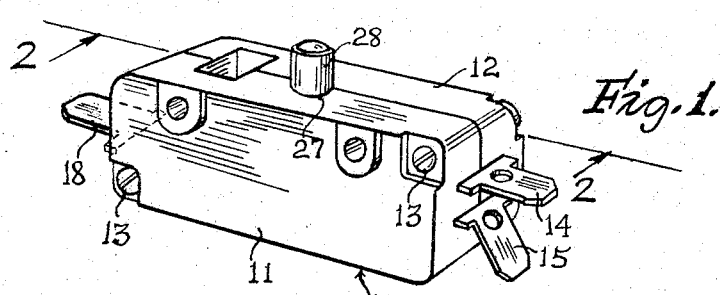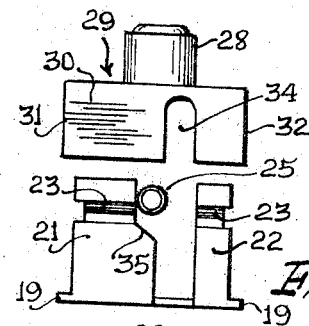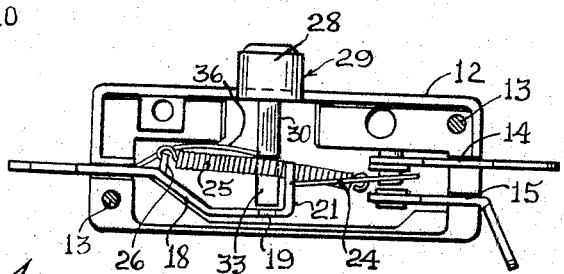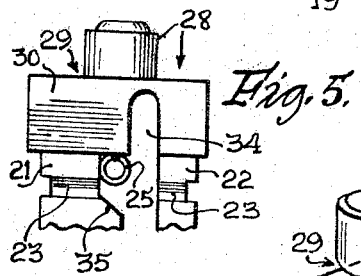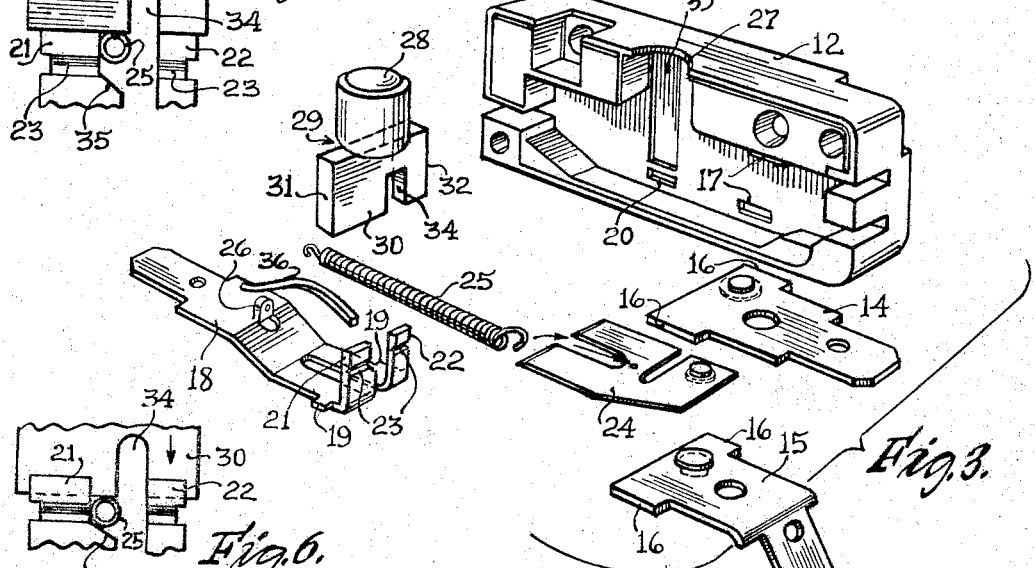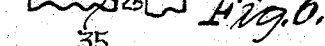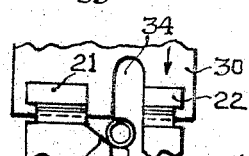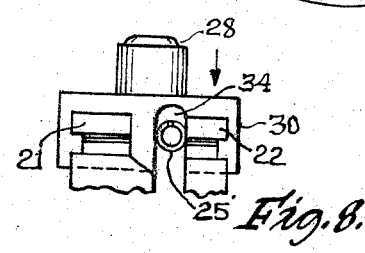

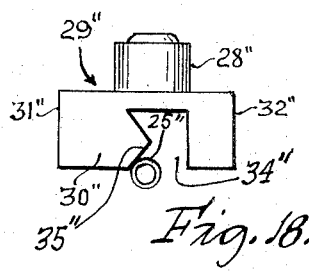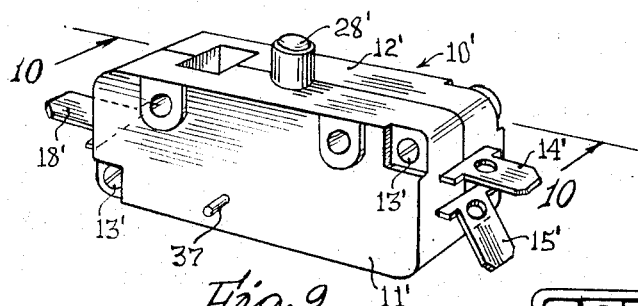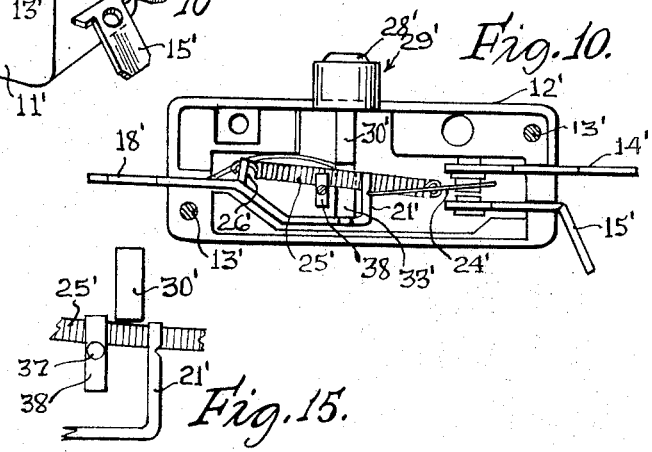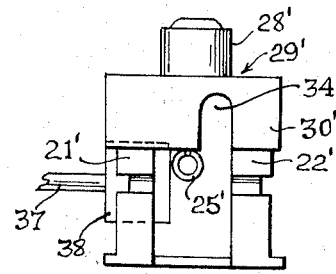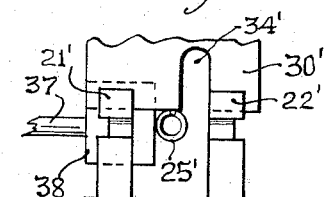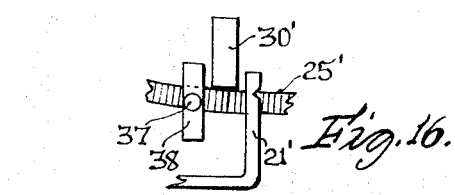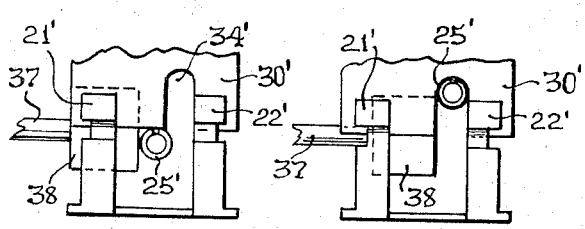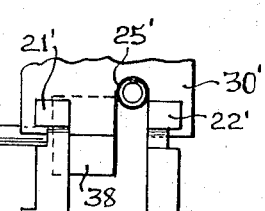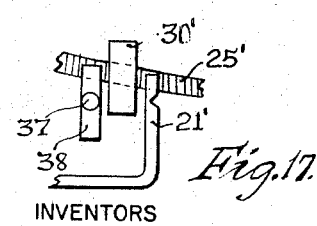
INVENTORS
ARNOLD A. BREVICK,
WALTER L. CHERRY,
JAMES U. DERNEHL
BY Edward C. Threedy
THEIR ATTORNEY.

3,337,702
NON-DEFEAT DOUBLE SNAP-ACTING SWITCH WITH OSCILLATING CONTACT
Arnold A. Brevick, Walter L. Cherry, and James U. Dernehl, Highland Park, Ill., assignors to Cherry Electrical Products Corp., Highland Park, Ill., a corporation of Illinois
Filed Feb. 25, 1963, Ser. No. 260,390
12 Claims. (Cl. 200—67)

This invention relates to new and useful improvements in a non-defeat double snap-acting switch with oscillating contact and, more particularly, to a switch having a snap-action movement which makes a momentary electrical contact, thus transmitting a single electrical pulse.

An object of this invention is to provide in a pulse switch of this character a snap-action switch blade movement which is manually initiated and automatically returned to its original condition regardless of any continuing actuating force upon the switch actuator.

A further object of this invention is to provide in a switch of this character a means whereby a single switching pulse is obtained for each movement of the switch actuator regardless of the distance or duration of its actuating movement.

Another object of this invention is to provide in a switch of this character a means for preventing a continuous switch contact after initial snap-action movement of the switch blade from and into a contact position.

A further object of this inveniton is to provide in a switch of this character a means whereby a movable switch blade will make a momentary electrical contact after its initial snap-action contact-making movement.

An equally important object of this invention is to provide in a pulse switch of this character an arrangement of parts wherein successive electrical contacts of the movable switch blade require a full successive reciprocatory movement of the switch actuator.

It is an object of the present invention to provide a pulse switch which is simple in construction and positive in operation and which utilizes certain switch elements of a conventional switch and in which modified components may be incorporated at low cost to achieve the desired objects of this invention.

Other objects will appear hereinafter.

The invention consists in the novel combination and arrangement of parts to be hereinafter described and claimed.

Them invention will be best understood by reference to the accompanying drawings showing the preferred form of construction, and in which:

FIG. 1 is a perspective view of the pulse switch of this invention;

FIG. 2 is a side elevational view taken on line 2—2 of FIG. 1;

FIG. 3 is a perspective view of the parts of the pulse switch in exploded relation;

FIG. 4 is a partial and elevational view of certain parts of the pulse switch;

FIGS. 5 through 8 are partial end elevational views showing certain parts of the pulse switch in progressive stages of actuation;

FIG. 9 is a perspective view of a modified pulse switch;

FIG. 10 is a side elevational view taken on line 10—10 of FIG. 9;

FIGS. 11 through 14 are partial end elevational views showing certain parts of the pulse switch in progressive stages of actuation;

FIGS. 15 through 17 are fragmentary side elevational views of the parts as shown in FIGS. 11 through 14; and FIG. 18 is a front elevational view of a modified switch actuator and fragmentarily showing the coil spring associated therewith.

A pulse switch of the character making up this invention is adapted to be used in connection with the control of a class of electrical appliances wherein the operation is initiated by the movement of the switch actuator which in turn operates the switch to cause a momentary electrical contact or an electrical pulse to be supplied to the operating circuitry of the associated appliance.

In the operation of such devices, particularly in a coin-operated machine used by the general public, the user may try to defeat the timed operation of the device by holding the switch actuator depressed, thus attempting to illegally gain a successive or recycling operation of the machine. This procedure may result in damaging the electrical machine as well as incurring loss of revenue for such machine. It is the object of this invention to provide a pulse switch that will afford protection against this type of abuse and at the same time achieve the new and desired objects hereinbefore stated.

The structure which permits the achievement of the desired objects may be a part of any well-known snap-action switch construction but is preferably made a part of the switch construction shown in the accompanying drawings which disclose a snap-action switch which is described and claimed in U.S. Patent No. 3,073,923, dated Jan. 15, 1963.

Referring to the drawings, a snap-action switch is generally indicated as at 10. The housing of the switch includes complementary hollow sections 11 and 12 adapted to be mounted together in facial abutment and secured by machine screws 13 or the like.

The snap-action switch 10 includes a pair of fixed contact terminal members 14 and 15. These terminal members 14 and 15 are positively positioned within the hollow sections 11 and 12 by means of positioning lugs 16 which are adapted to be projected into aligned recesses 17 formed in confronting inner walls of each of the sections 11 and 12.

A combination terminal plate and supporting member 18 is adapted to be positioned within the switch housing in spaced relation with respect to the terminals 14 and 15 as viewed in FIG. 2.

This terminal plate and supporting member 18 are provided with laterally projecting lugs 19 which are adapted to be positioned in aligned recesses 20 formed in the confronting faces of the side walls of each of the sections 11 and 12.

This terminal plate and supporting member 18 provides a pair of spaced apart vertically extending pivot posts 21 and 22, which posts have formed in one face thereof horizontally aligned notches 23.

A snap-acting mechanism is associated with this pulse switch and includes a substantially U-shaped movable switch blade 24. The free ends of the arms of the switch blade 24 are adapted to be pivotally positioned in the notches 23 formed in the one face of each of the supporting posts 21 and 22, as seen in FIG. 2.

A coil spring 25 extends between the posts 21 and 22 and is connected to the switch blade 24 at one end and anchored at the opposite end to a lug 26 struck from the supporting member 18. The above described parts are arranged as shown in FIG. 2, wherein it is indicated that the switch blade is in contact with the fixed terminal 14.

Projecting out of a suitable opening 27 formed in the top walls of the mating sections 11 and 12 of the switch housing is the exposed end 28 of a switch actuator 29. This switch actuator 29 provides a substantially rectangularly shaped lower body portion 30 which is of a sufficient width so that the opposite vertical edges 31 and 32 slidably project into recessed guiding slots 33 formed in the opposite inner surfaces of the side walls of each of the sections 11 and 12. These guiding slots maintain a prescribed path of movement of the actuator as it is moved inwardly of the switch housing.

The spring 25 of the snap-acting mechanism is so arranged that it extends transversely to the rectangularly shaped body portion 30 and normally lies in the path of movement of the actuator 29, as seen in FIG. 2. The lower body portion 30 of the actuator 29 has formed therein a slot 34. This slot 34 extends upwardly from the bottom edge of the lower body portion 30 and is horizontally offset with respect to the normal horizontal centerline of the spring 25. (See FIGS. 4 and 5.)

The outer edge of the slot 34 is in line with the inner vertical edge of the supporting pivot post 22. The confronting inner edge of the post 21 is provided with a camming surface 35 which extends downwardly and in the direction of the supporting post 22 as seen in FIGS. 3 and 4. In normal condition, the spring 25 will extend between the posts 21 and 22 in a horizontal plane slightly above the notches 23 formed in the one face of the posts 21 and 22. The camming surface 35 provided by the post 21 is adapted to extend below the notches 23, this for a purpose hereinafter made apparent.

The sequential operation of the various parts of this pulse switch will be now described and reference will be made to the fragmentary end elevational views shown in FIGS. 5 through 8.

In FIG. 5, the switch actuator 29 by any external force is being depressed inwardly of the switch housing. The bottom edge of the lower body portion 30 engages the coil spring 25.

In FIG. 6, the continuing applied pressure to the actuator 29 has caused the spring 25 to be biased out of its normal horizontal plane, downwardly between the posts 21 and 22 and in the direction of the camming surface 35 provided by the post 21.

In FIG. 7, the coil spring 25 has been biased below the center line of the blade 24 so that a snap-action movement is effected, causing the blade 24 to move into contact with the lower fixed terminal 15. The spring 25 has been moved into engagement with the camming surface 35 and has been caused to move horizontally out of its normal longitudinal plane.

FIG. 8 shows the actuator 29 as having been depressed to such an extent that the spring 25 has been forced off the camming surface 35 and moved laterally into alignment with the slot 34 formed in the lower body portion 30 of the actuator. In such a position, the spring 25 will automatically return to its original condition as shown in FIG. 2, causing the switch blade to snap back into contact with the upper fixed terminal 14. It is thus readily seen than upon a single depression of the actuator 29 the snap-acting mechanism will cause a momentary switching of the position of the switch blade 24 relative to the fixed terminals 14 and 15. This momentary switching of the blade is accomplished notwithstanding that the actuator 29 is held in its depressed condition.

In a normal snap-action switch, the coil spring 25 performs the additional function of restoring the actuator 29 to its normal position. However, due to the construction and operation of the pulse switch hereinbefore described, the coil spring 25 will not restore the actuator 29 to its original position. To accomplish this, we provide a means which in the present instance is in the form of a spring wire 36, which has one end connected in any suitable manner to the combination terminal support member 18 while its opposite free end is in engagement with the lower body portion 30 of the actuator 29. The spring wire 36 is so shaped that it will normally bias the actuator 29 into its normal position when an actuating force is removed therefrom. If desired, the spring wire 36 may be so formed as to be merely trapped in the configuration of the switch housing instead of being positively connected to any structure thereof.

While it has been shown that the camming surface 35 is provided by the post 21, it is readily apparent and falls within the contemplation of this invention that such camming surface could be provided by an independent structure or be a molded detent formed on the inner wall surface of one of the mating sections 11 and 12 and extending inwardly of the cavity therebetween.

To illustrate the independent structure by which the objects of this invention can be accomplished, reference is made to FIGS. 9 through 17 which show a modified spring restoring mechanism.

In FIG. 9, we disclose a switch structure identical to that shown in FIG. 1 and hereinbefore described, with the addition of a slidable plunger 37 which extends laterally out of the side wall 11' of the modified switch housing 10'.

Within the cavity of the switch housing 10', the plunger 37 terminates into a rectangularly shaped end member 38. As viewed in FIG. 10, this end member 38 will normally lie in a plane parallel to the lower body portion 30' of the switch actuator 29' and to one side of the normal longitudinal plane of the coil spring 25'.

FIGS. 11 through 14 illustrate the progressive movement of the switch actuator 29', the coil spring 25', as well as the end member 38 of the spring-restoring mechanism of the modified form. FIGS. 15, 16, and 17 are fragmentary side elevational views of the corresponding parts as shown in FIGS. 11, 12, and 14.

As shown in FIG. 12, as the lower body portion 30' of the switch actuator 29' is depressed into the switch housing 10' it moves against and deforms the coil spring 25' out of its normal longitudinal plane. In FIG. 13 it is seen that the spring 25' has been depressed a sufficient distance so as to cause the movable switch blade 24' to move with a snap-action into contact with the other of the fixed terminals.

At this point in the operation of the modified switch the plunger 37 may be caused to be slidably projected through the side wall 11' of the switch housing 10' so as to move the end member thereof against the depressed coil spring 25'.

The movement of the end member 38 will laterally dispose the coil spring 25' a sufficient distance so that the spring 25' will be in alignment with the slot 34' formed in the lower body portion 30' of the switch actuator 29'. By this lateral movement of the coil spring 25' by the end member 38, the coil spring 25' will move upwardly through the slot 34' into its original longitudinal plane as shown in FIG. 10 wherein it will cause the movable switch blade 24' to return to its original position.

The movement of the plunger 37 may be the result of a cam member or a thermal responsive element which is caused to be actuated after an initial period of switch contact movement. It is readily apparent from the arrangement of parts of this pulse switch that the spring 25' will be caused to be moved into its original position, as seen in FIG. 10, regardless of the position of the switch actuator 29'.

In FIG. 18 we show a modified switch actuator 29" having a circular exposed end 28" adapted to extend out of the top of the switch housing. The modified switch actuator 29" is provided with an enlarged substantially rectangularly shaped body portion 30". This lower body portion 30" is provided with a cut-out 34" which extends upwardly from the bottom edge thereof as seen in FIG. 18. One side wall defining the cut-out 34" is provided with a spring restoring surface 35". In operation, the coil spring 25" will be engaged by a portion of the spring restoring surface 35" as the switch actuator 29" is actuated. The spring restoring surface 35" is of such a configuration that it will offer sufficient downward pressure upon the spring 25" so as to effect snap-action movement of the associated switch blade. However, as the downward movement of the actuator 29" continues, the spring 25" will be shifted laterally by the spring restoring surface 35" until such spring 25" freely passes into the cut-out portion 34" of the actuator 29".

The function and operation of the switch when equipped with the modified switch actuator 29" is the same as hereinbefore described.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. In a switch of the class described, the combination comprising:
   (a) a pair of spaced apart fixed contacts,
   (b) a snap-acting mechanism including a movable switch blade and a coil spring connected to said blade at one end and anchored at the other so that planar displacement of the coil spring causes a switching movement of the blade between said pair of fixed contacts,
   (c) a movable switch actuator so arranged that the spring is in the path of movement thereof so that the blade is caused to be moved between the fixed contacts when the actuator is moved against the spring,
   (d) a spring-restoring member located on the opposite side of the spring,
   (e) said member presenting a spring-restoring surface for camming the spring laterally out of engagement with the engaging portion of said switch actuator, permitting it to be returned to its normal plane and the blade to be moved back to its normal position notwithstanding the depressed position of said actuator.

2. In a switch of the class described and defined by claim 1 wherein said movable switch actuator is provided with a vertically extending slot extending upwardly from the bottom edge thereof and into which said coil spring is adapted to be moved by said spring-restoring surface after said switch actuator has moved said spring whereby said blade is moved between said fixed contacts.

3. A pulse switch comprising:
   (a) a pair of spaced apart fixed contacts,
   (b) a switch blade having one end movable between said fixed contacts,
   (c) a fixed pivotal support for the other end of said switch blade,
   (d) a coil spring connected to said blade between its one end and its pivotal connection to said support and anchored at the other end so that horizontal displacement of such spring will cause a switch movement of one end of said blade between said pair of fixed contacts,
   (e) a movable switch actuator so arranged that the spring is in the path of movement thereof whereby said spring is caused to be deformed out of its normal horizontal plane below the point of pivotal contact of said switch blade to effect pivotal movement of said switch blade between said fixed contacts,
   (f) a spring-restoring member in the path of movement of said spring as it is moved by said switch actuator for moving said spring laterally out of engagement with said switch actuator so as to permit it to return to its normal horizontal plane and the switch blade to be moved back to its normal position notwithstanding the depressed position of said switch actuator.

4. A pulse switch as defined by claim 3 wherein said movable switch actuator is provided with a vertically extending slot extending upwardly from the bottom edge thereof and into which said coil spring is adapted to be moved by said spring restoring member after said switch actuator has moved said spring whereby said blade is moved between said fixed contacts.

5. A switch of the class described comprising:
   (a) a pair of spaced apart fixed contacts,
   (b) a switch blade having one end movable between said fixed contacts,
   (c) a fixed pivotal support for the other end of said switch blade,
   (d) a coil spring connected to said blade and to a portion of said fixed support and adapted to normally pivot said blade into contact with one of said fixed contacts,
   (e) a movable switch actuator having a portion thereof in contact with said spring and adapted to deform said spring out of its normal plane to effect pivotal movement of said one end of said blade between said fixed contacts,
   (f) said switch actuator having formed therein a cut-out portion extending vertically from the bottom edge thereof,
   (g) and a spring deflecting surface provided by said actuator and engageable with said spring for laterally shifting the same into said cut-out portion formed in said actuator so that said spring may return to its normal plane after being deformed out of its normal plane by initial movement of said actuator.

6. A switch of the class described comprising:
   (a) a pair of spaced apart fixed contacts,
   (b) a switch blade having one end movable between said fixed contacts,
   (c) a fixed pivotal support for the other end of said switch blade,
   (d) a coil spring connected to said blade and to a portion of said fixed support and adapted to normally pivot said blade into contact with one of said fixed contacts,
   (e) a switch actuator movable relative to said spring so as to contact said spring and deform the same out of its normal plane to effect pivotal movement of said one end of said blade between said fixed contacts,
   (f) said switch actuator having formed therein a cut-out portion extending vertically from the bottom edge thereof,
   (g) and a spring deflecting surface provided by said actuator and engageable with said spring for laterally shifting the same into said cut-out portion formed in said actuator so that said spring may return to its normal plane after being deformed out of its normal plane by initial movement of said actuator.

7. A switch of the class described the combination comprising:
   (a) a pair of spaced apart fixed contacts,
   (b) a snap-acting mechanism including a movable switch blade and a coil spring connected to said blade at one end and anchored at the other so that horizontal displacement of the spring will cause a switching movement of the blade between said pair of fixed contacts,
   (c) a movable switch actuator so arranged that the coil spring is in the path of movement thereof so that the blade is caused to be moved between the fixed contacts when the actuator is moved against the spring,
   (d) a movable spring-restoring member normally out of contact with said spring,
   (e) said member presenting a spring-restoring surface for contacting the spring and moving the same laterally out of engagement with the engaging portion of said switch actuator, permitting it to be returned to its normal horizontal plane and the blade to be moved back to its normal position notwithstanding the depressed position of said actuator,
   (f) said spring-restoring member movable independently of said actuator in a direction transversely to the horizontal plane of said spring so that the spring-restoring surface thereof engages said spring substantially at right angles to its longitudinal length.

8. A switch of the class described and defined by claim 7 wherein said movable switch actuator is provided with a vertically extending slot into which said coil spring is adapted to be moved by said movable spring-restoring member so that said spring may be restored to its normal longitudinal plane notwithstanding the depressed position of said movable switch actuator.

9. In a switch of the class described, the combination comprising:
   (a) a pair of spaced apart fixed contacts,
   (b) a snap-acting mechanism including a pivotally supported movable switch blade and a coil spring having one end connected to said switch blade and its opposite end anchored so that planar displacement of the coil spring causes a pivotal switching movement of the blade between the fixed contacts,
   (c) a movable first member so arranged that said coil spring is in the path of movement thereof so that said spring is longitudinally displaced to cause said blade to pivot between the fixed contacts when said first member is moved against said spring,
   (d) a second member movable relative to said spring and presenting a surface engaging said spring as it is moved by said first member to laterally displace said spring out of contact with said first member and restore it to its original position notwithstanding the moved said first member.

10. A pulse switch comprising:
    (a) a pair of spaced apart fixed contacts,
    (b) a switch blade having one end movable between said fixed contacts,
    (c) a fixed pivotal support for the other end of said switch blade,
    (d) a coil spring connected to said blade between its one end and its pivotal connection to said support and anchored at the other end so that longitudinal displacement of such spring will cause a switch movement of the one end of said blade between said pair of fixed contacts,
    (e) a movable switch actuator so arranged that the spring is in the path of movement thereof whereby said spring is caused to be deformed out of its normal longitudinal plane below the point of pivotal contact of said switch blade to effect pivotal movement of said switch blade between said fixed contacts,
    (f) a spring restoring member provided by said fixed pivotal support and in the path of movement of said switch actuator as it is moved by said switch actuator for moving said spring laterally out of engagement with said switch actuator so as to permit it to return to its normal longitudinal plane and the switch blade to be moved back to its normal position notwithstanding the depressed position of said switch actuator,
    (g) said spring restoring member including a camming surface formed as an integral portion of said pivotal support for said switch blade and normally disposed in the path of movement of said spring as the same is moved by said movable switch actuator.

11. The combination in a switch of the class described having a pair of spaced apart fixed contacts, a switch blade having one end movable between the spaced apart fixed contacts, a snap acting mechanism including a switch blade support, a movable switch actuator and a coil spring connected to the support and the switch blade for pivotally connecting one end of the blade to the support, with the spring adapted to be deformed out of its normal plane by initial movement of the actuator so as to effect pivotal movement of the switch blade between the fixed contacts,
    (a) of a spring deflecting means engaging the deformed spring and deflecting it transversely to the movement of and out of contact with said switch actuator to permit said spring to return to its normal plane so as to be ineffective to pivot the switch blade between said fixed contacts.

12. In a non-defeat switch for use with a timing device or the like, the combination comprising a fixed contact, a movable contact, a toggle member mounting said movable contact at one end and having mounting means at the other end providing a hinged joint, a coil spring connected at one end to the toggle member and fixedly anchored at the other so that actuating force applied in a first direction against the central portion of the spring causes the same to be moved bodily overcenter for operation of the contacts, a first switch operating member having a presented edge for engaging the spring for movement in the first direction, a second operating member having a presented edge for engagement of the spring for movement of the same in a substantially different direction, said first operating member having a relief adjacent its presented edge and at least one of the presented edges being angled to provide a lateral camming surface so that when the switch operating members are both depressed the spring is cammed laterally into said relief thereby permitting the second operator to override the action of the first operator.

No references cited.

ROBERT K. SCHAEFER, *Primary Examiner.*

BERNARD A. GILHEANY, *Examiner.*

H. B. O'DONNELL, D. SMITH, Jr, *Assistant Examiners.*